No. 682,873. Patented Sept. 17, 1901.
F. D. JOY.
METAL HOSE COUPLING AND WASHER.
(Application filed June 23, 1900.)
(No Model.)

Witnesses.
Geo. W. Hill
Arza Crabb

Inventor.
F. D. Joy.

UNITED STATES PATENT OFFICE.

FRANCISCO D. JOY, OF GLENDORA, CALIFORNIA.

METAL HOSE-COUPLING AND WASHER.

SPECIFICATION forming part of Letters Patent No. 682,873, dated September 17, 1901.

Application filed June 23, 1900. Serial No. 21,395. (No model.)

*To all whom it may concern:*

Be it known that I, FRANCISCO D. JOY, a citizen of the United States, residing near Glendora, in the county of Los Angeles and State of California, have invented a new and Improved Hose-Coupling, of which the following is a specification.

My invention is an improvement in that class of hose-couplings employed for connecting different sections of hose with each other or with a hydrant or tank to or from which liquids are designed to flow.

The improvement relates particularly to the construction of the coupling proper and the washer used therewith, whereby when the washer is placed in due position it will retain it under all ordinary conditions of use and disuse until intentionally removed. The construction and combination of parts whereby this object is attained are illustrated in the accompanying drawings, in which—

Figure 1:
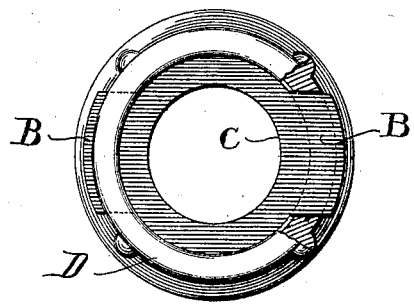
Figure 2:
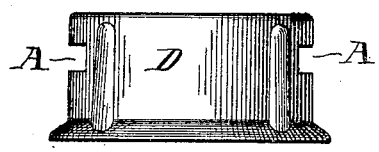
Figure 5:
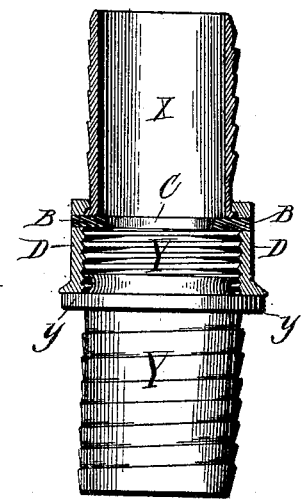
Figure 3:
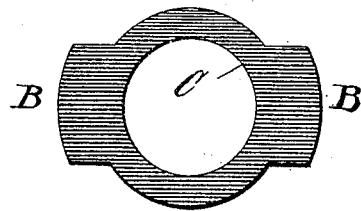
Figure 4:
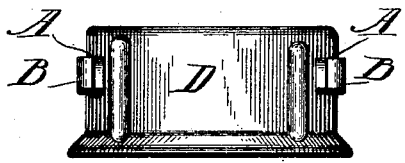

Figure 1 is a plan view of my improved hose-coupling with the washer in position, a portion being broken away to show the arrangement of the washer. Fig. 2 is a side view of the coupling-section without the washer. Fig. 3 is a plan view of the washer. Fig. 4 is a side view of the section with the washer in place. Fig. 5 is a part plan and part sectional view of a complete coupling in which my invention is applied.

The metal coupling-section D has the same form as one which has long been in general use, but differs therefrom in that arc slots A are provided in its side walls at opposite sides to receive the washer, as shown in Figs. 1, 4, and 5. The washer has a circular opening C (see Fig. 3) and lateral extensions B at opposite sides. The circular body of the washer is adapted to fit in the hose-coupling section D, and the extensions or wings B project through and beyond the slots A in said body. By this means the washer is securely held in place during all ordinary conditions of use, and yet, owing to its flexibility, it may be readily detached and a new one substituted when required. It will be noted that the extremities of the extensions or wings B are curved concentrically with the hose-section D. This means for applying and securing the washer constitute an improvement upon those hose-couplings in which the washer is held in a shallow groove or by some form of corrugation within the hose-coupling section and which have proved unsatisfactory and unreliable, especially when the washers have become slightly worn or shrunken.

In Fig. 5 I illustrate the washer C as applied in a complete coupling, the letters X and Y indicating tubes to which elastic hose is secured in practice, the same being provided with circumferential ribs or corrugations and connected by the section D in a well-known manner. Thus the said section is screwed on the threaded portion or tenon of part Y, its flared end abutting the collar $y$ of the latter and the part X having a rotatable attachment to section D. The washer C is pressed by the tenon of Y against the head of part X when the parts are screwed together, thus forming a tight joint.

What I claim is—

1. A hose-coupling section of the class described comprising the section proper having lateral slots and a washer having lateral extensions adapted to fit in said slots, substantially as shown and described.

2. The improved hose-coupling section formed of a cylindrical body having lateral slots extending parallel to its end portions, substantially as shown and described.

3. The combination, with a hose-coupling section of the class described having lateral sockets, of a washer having a central opening and lateral extensions or wings adapted to enter said sockets and thereby hold the washer in place, substantially as shown and described.

4. The washer for the hose-coupling section, the same having an annular body and opposite lateral extensions or wings, substantially as shown and described.

In testimony whereof I have signed my name to this specification in the presence of two subscribing witnesses.

FRANCISCO D. JOY.

Witnesses:
OLIVER YOUNGS,
CHARLES F. SCHWAN.